(12) United States Patent
Gould et al.

(10) Patent No.: US 7,691,474 B2
(45) Date of Patent: Apr. 6, 2010

(54) MITIGATION OF HYDROGEN CYANIDE IN AEROGELS

(75) Inventors: George Leighton Gould, Mendon, MA (US); Wendell Eugene Rhine, Belmont, MA (US); Redouane Begag, Hudson, MA (US); Xiangjun Hu, Northborough, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 767 days.

(21) Appl. No.: 11/384,035

(22) Filed: Mar. 18, 2006

(65) Prior Publication Data

US 2007/0217986 A1    Sep. 20, 2007

(51) Int. Cl.
*B32B 3/26* (2006.01)

(52) U.S. Cl. .............. 428/319.1; 428/307.7; 428/317.9; 428/312.6; 428/313.9

(58) Field of Classification Search .......... 524/430; 442/63, 74; 428/312.6, 312.8
See application file for complete search history.

(56) References Cited

U.S. PATENT DOCUMENTS

| 4,109,067 A | 8/1978 | Deets |
| 4,115,353 A | 9/1978 | Deets |
| 5,137,659 A | 8/1992 | Ashley et al. |
| 5,538,931 A | 7/1996 | Heinrichs et al. |
| 5,720,785 A | 2/1998 | Baker |
| 2002/0094426 A1* | 7/2002 | Stepanian et al. ........ 428/292.1 |
| 2004/0214358 A1 | 10/2004 | Negley |

OTHER PUBLICATIONS

Morris et al. (Science 284(23), 1999, 622-624).*
Gedevanishvili et al. J. Anal. Appl. Pyrolysis 76 (2006), 70-79.*
Hund et al., "Synthesis of homogeneous alloy metal nanoparticles in silica aerogels" Journal of Non-Crystalline Solids (2004) 350: 9-13.
Leventis et al., "Using Nanoscopic Hosts, Magnetic Guests, and Field Alignment to Create Anisotropic Composite Gels and Aerogels" Nano Letters (2002) 2 (1): 63-67.
Morita et al., "Luminescence properties of nanophosphors: metal ion-doped sol-gel silica glasses" Materials Science—Poland (2004) 22 (1): 5-15.

* cited by examiner

*Primary Examiner*—David Wu
*Assistant Examiner*—Vu Nguyen
(74) *Attorney, Agent, or Firm*—Poongunran Muthukumaran

(57) ABSTRACT

An embodiment of the present invention describes aerogel materials comprising an additive comprising a compound comprising at least two different metal elements. Another embodiment, involves aerogel particulates in combination with said compound. Said compound preferably comprises at least two different transition metal elements and may be in an oxide form.

34 Claims, No Drawings

MITIGATION OF HYDROGEN CYANIDE IN AEROGELS

STATEMENT REGARDING FEDERALLY SPONSORED RESEARCH OR DEVELOPMENT

This invention was partially made with Government support under Contract N65540-04-C-0008 awarded by the United States Navy. The Government may have certain rights in parts of this invention.

FIELD OF THE INVENTION

This invention relates in general to methods of reducing hydrogen cyanide (HCN) concentrations in aerogels and aerogel composites.

SUMMARY OF THE INVENTION

Embodiments of the present invention describe an aerogels with reduced hydrogen cyanide (HCN) emission and a method for preparing the same. Accordingly, a method for preparing an aerogel (and aerogel composite) comprises the steps of: providing a solution comprising gel precursors; incorporating an additive into said solution prior to gellation thereof, said additive comprising a compound comprising of at least two different metal elements; allowing said solution to form a gel; and drying said gel thereby resulting in an aerogel material. Said compound may comprise at least two different transition metal elements. A further optional step involves introducing the solution into a fibrous material; In one embodiment said compound is in oxide form. A non-limiting example of such oxides includes those with a general chemical formula of $AB_2O_4$ where A and B represent transition metal elements. Such compounds may be further exemplified by spinels. In another embodiment the additive comprises a mixture of metal oxides. In a specific embodiment, the compound comprises iron, copper, manganese, molybdenum or a combination thereof. In yet another embodiment, the compound has a general formula: $(Fe,Mn)(Fe,Mn)_2O_4:CuO$. The additive may be present at between about 0.1% and 10% by weight of the aerogel. In one embodiment, the aerogel is based on silica, titania, zirconia, alumina, hafnia, yttria, ceria, carbides nitrides or a combination thereof. In another embodiment, the fibrous material (of an aerogel composite) is in the form of a felt, mat, batting, chopped fibers or a combination thereof. Another embodiment describes a composition comprising aerogel particulates and a compound, said compound comprising at least two different metals as in the previous embodiments.

DESCRIPTION

Embodiments of the present invention concern methods for reducing hydrogen cyanide concentration in aerogel materials. A specific example involves aerogel composites that can be utilized for firewall barrier applications wherein the aerogel matrix is reinforced with a nitrogen-containing carbon fiber felt. In some instances, the nitrogen-containing carbon fiber is based on oxidized polyacrylonitrile which has excellent flame resistance. However, it is well known that polyacrylonitrile-based carbon fibers contain nitrogen and can release significant amounts of hydrogen cyanide (e.g. 30-50 ppm) during flame exposure. For certain applications, it is required that the HCN emission during flaming exposure be less than 30 ppm, thereby requiring reduction in HCN gas emitted. In this case, there are not many options for directly reducing the HCN emission from the carbon fiber other than to modify the chemical composition of the carbon fiber by, for example, heat treatment, coating, or chemical doping.

It is taught in U.S. Pat. No. 4,115,353 that doping alkali metal carbonates and cupric oxide into a styrene/acrylonitrile copolymer is beneficial in reducing the amounts of HCN emission on combustion of the copolymer. Therefore a change in the chemical composition of the source of HCN is required.

U.S. Pat. No. 5,720,785 discloses a method for reducing the hydrogen cyanide and ammonia content from a nitrogen-containing coal feed during combustion by mixing an iron-containing compound with the coal feed. In order for this method to effectively reduce the HCN concentration, the coal feed must be pulverized into fine particles so that the iron-containing compound can be mixed with the coal feed. Obviously, this method is not suitable for systems in which the HCN-emitting component has a fibrous structure. In addition, this method requires exceedingly high temperatures (over 1480° C.) and pressures (greater than 300 psig) in certain reaction zones. Such temperatures and pressures are not practical for most fire resistance applications.

Some previous efforts have taught methods to catalytically oxidize HCN in exhaust gases wherein the HCN is substantially released from the HCN-emitting compound into an exhaust gas stream and subsequently mitigated. These methods are not suitable for the applications of concern here in that if the generated HCN is allowed to enter the atmosphere, it will be very difficult to mitigate under the environments of real fire resistance applications. Therefore, a need still exists for an effective and practical system for mitigation of HCN in aerogels materials.

Aerogel materials are excellent insulators due mainly to their low density and highly porous structure. The sol-gel process is one method for preparing gel materials; where a solution (sol) comprising precursors for the gel materials is prepared and upon gellation and subsequent drying results in an aerogel material. Sol-gel process is described in detail in Brinker C. J., and Scherer G. W., *Sol-Gel Science*; New York: Academic Press, 1990; hereby incorporated by reference.

Within the context of embodiments of the present invention "aerogels" or "aerogel materials" along with their respective singular forms, refer to gels containing air as a dispersion medium in a broad sense, and include aerogels, xerogels and cryogels in a narrow sense. The chemical composition of aerogels can be inorganic, organic (including polymers) or hybrid organic-inorganic. Examples of inorganic aerogels include, but are not limited to silica, titania, zirconia, alumina, hafnia, yttria, ceria, carbides and nitrides. Organic aerogels can be based on compounds such as but are not limited to: urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiene, melamine-formaldehyde, phenol-furfural, a member of the polyether family of materials or combinations thereof. Examples of organic-inorganic hybrid aerogels include, but are not limited to: silica-PMMA, silica-chitosan, silica-polyether or possibly a combination of the aforementioned organic and inorganic compounds. Published US patent applications 2005/0192367 and 2005/0192366 teach extensively of such hybrid organic-inorganic materials and are hereby incorporated by reference in their entirety.

Drying may be accomplished using a variety of methods known in the art. U.S. Pat. No. 6,670,402 herein incorporated by reference, teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 herein incorporated by reference, describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 herein incorporated by reference, discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 herein incorporated by reference describes a process whereby Resorcinol/Formaldehyde aerogels can be manufactured using a simple air drying procedure. Finally, U.S. Pat. No. 5,565,142 herein incorporated by reference describes subcritical drying techniques. The embodiments of the present invention can be practiced with drying using any of the above techniques. In some embodiments, it is preferred that the drying is performed at vacuum to below super-critical pressures (pressures below the critical pressure of the fluid present in the gel at some point) and optionally using surface modifying agents. Aerogels can be opacified with compounds such as but not limited to: $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

Nitrogen-containing hydrocarbons may form toxic HCN during degradation in high temperatures events such as fires. A heat flux of about 40 $kW/m^2$ has been associated with that arising from typical fires (Behavior of Charring Solids under Fire-Level Heat Fluxes; Milosavljevic, I., Suuberg, E. M.; NISTIR 5499; September 1994). However, generally speaking, temperatures high enough to initiate HCN formation from nitrogen-containing hydrocarbons are of concern here.

Aerogels comprising an inorganic composition are excellent materials for fire barriers, though there may be instances where organic or hybrid organic-inorganic aerogels are used. Furthermore, they can be prepared in flexible form for example when reinforced with fibrous materials. The fibrous materials may comprise organic polymer-based fibers (e.g. polyethylenes, polypropylenes, polyacrylonitriles, polyamids, aramids, polyesters etc.) inorganic fibers (e.g. carbon, quartz, glass, etc.) or both and in forms of, wovens, nonwovens, mats, felts, battings, lofty battings, chopped fibers, or a combination thereof. Aerogel composites reinforced with a fibrous batting, herein referred to as "blankets", are particularly useful for applications requiring flexibility since they can conform to three-dimensional surfaces and provide very low thermal conductivity. Aerogel blankets and similar fiber-reinforced aerogel composites are described in published US patent application 2002/0094426A1 and U.S. Pat. Nos. 6,068,882, 5,789,075, 5,306,555, 6,887,563, and 6,080,475, all hereby incorporated by reference, in their entirety. Some embodiments of the present invention utilize aerogel blankets, though similar aerogel composites (e.g. those disclosed by reference) may also be utilized.

Aerogels reinforced with nitrogen-containing hydrocarbon-based fibers are of particular interest. Although the fibers may release HCN during high temperature events, the HCN may be consumed if there is sufficient oxygen in the area and if the temperature is sufficiently high, making further oxidation of HCN possible. It should be noted that although fibers may constitute the source of HCN is these aerogel materials, other components of an aerogel composite may also be responsible for the same. For instance particulates as additives or reinforcement phases may also comprise nitrogen-containing hydrocarbons and thus can liberate HCN in high temperature events.

Embodiments of the present invention describe aerogels materials with additives for mitigation of HCN. The aerogel matrix can serve as an ideal supporting matrix for the additional additives that catalyze HCN oxidation. These additives can be finely dispersed with their reactive surface sites exposed to the channels in the highly porous aerogel matrix. Thus, the existence of the aerogel architecture makes HCN mitigation with the above approach possible.

According to embodiments of the present invention, additives comprising a compound comprising at least two different metal elements, are used to catalyze HCN oxidation reactions in an aerogel (or aerogel composite) material. The metal elements are preferably transition metals. In one embodiment, the compound is in oxide form. A non-limiting example of such oxides includes those with a general chemical formula of $AB_2O_4$ where A and B represent transition metal elements. Such compounds may be further exemplified by spinels.

In another embodiment the additive comprises a mixture of metal oxides. For instance oxides comprising one or more metal elements can be combined in various ratios. Transition metal elements are preferred; however, a mixture of transition metal and non-transition metal oxides may also be desired.

In a specific embodiment, the compound comprises iron, copper, manganese, molybdenum or a combination thereof. In yet another embodiment, the compound has a general formula: $(Fe,Mn)(Fe,Mn)_2O_4$:CuO. Dispersion of these additives as fine particles (e.g. nano-sized) can significantly reduce HCN concentration therein (see table 1.) For instance, powder forms of inorganic pigments belonging to the C.I. Pigment Black 26 chemical family are used as the additives. A general chemical formula of this family is $(Fe,Mn)(Fe,Mn)_2O_4$:CuO (Manganese Ferrite Black Spinel) where an example of such compounds is commercially available from Ferro Corporation under the trade name of F-6331-2 COAL BLACK®. Typically these additives are powders with mean particle size of less than about 100 nanometers.

The amount of the additive used can be from 0.1 to 10 percent by weight but is preferably between 0.5 and 2.5 percent based on the aerogel weight. About 1 percent by weight based on the aerogel weight is most preferred.

Incorporation of the additive into the aerogel structure can be carried out during synthesis of the gel. One route is via dispersion of the additive powder in the sol comprising the aerogel precursors. It is noted that the additive may be incorporated into the sol at any point before it gels. Gel formation may be understood as the point where the sol polymerizes into a continuous network and/or displays the characteristic of increased resistance to flowing. In some instances it may be desired to utilize a dispersant (surfactant) to facilitate dispersion of the additive.

In a non-limiting example, an amount of DISPERBYK-184® (manufactured by BYK-Chemie Corporation) is added to the sol. Satisfactory dispersion is generally achieved by vigorously stirring the mixture of sol, additive powder, and dispersant for over 30 minutes. Subsequent to the mixing, a gelling agent may be introduced to the sol so that it gels in less time (e.g. 5 minutes.) Immediately after the introduction of the gelling agent, the sol can be cast onto a fibrous matrix such as a carbon felt, allowed to gel, aged, and dried in supercritical $CO_2$ to yield a carbon fiber/aerogel composite with finely dispersed HCN mitigating additives inside the aerogel matrix.

The effectiveness of the additives in mitigating HCN emission from aerogel composites during flaming exposure is demonstrated by the following example:

In this example, the HCN emission levels of composite samples containing different amounts of F-6331-2 COAL BLACK® under flaming exposure were measured. The samples are silica aerogel composites reinforced with polyester fibers. The test was carried out in general accordance with ASTM E 662, and was supplemented with gas analysis using FTIR spectroscopy. A summary of the results is shown in table 1.

| Sample ID | Additive % (based on weight of composite) | Concentration of HCN (ppm) | % Reduction in HCN |
|---|---|---|---|
| 1 | 0 | 34 | 0 |
| 2 | 0.5 | 8 | 76 |
| 3 | 1 | 8 | 76 |
| 4 | 2.5 | 0 | 100 |
| 5 | 5 | 0 | 100 |

Another embodiment involves a composition comprising aerogels particulates and additives, wherein said additives comprise of a compound comprising at least two different metals. The metal elements are preferably transition metals. Furthermore, the compound may be in oxide form. A non-limiting example of such oxides includes those with a general chemical formula of $AB_2O_4$ where A and B represent transition metal elements. Such compounds may be further exemplified by spinels. In another aspect, the additives comprise a mixture of metal oxides. For instance oxides comprising one or more metal elements can be combined in various ratios. Transition metal elements are preferred; however, a mixture of transition metal and non-transition metal oxides may also be desired.

The aerogel particulates as used herein include beads, substantially spherical particles, irregular particles and the like. Furthermore, aerogel beads of various diameters may be utilized. Generally, beads of about 0.1 μm in diameter or larger can be used. In one instance, beads with diameters larger than about 0.5 mm or larger than about 1.0 mm are used. In some instances, the beads can have diameters as large as about 2 cm.

The aerogel particles can be bound to each other and/or the additives with a binder. Both aqueous and non-aqueous (organic) based binders may be suitable depending on the nature of the aerogel particulates and the end application of the composition. A non-limiting list of binders comprises: acrylics, silicones, phenolic polymers, acrylic styrene copolymers, vinyl acrylic polymers, epoxy acrylic copolymers, acrylic vinyl acetate copolymers, styrene butadiene copolymer and cellulose acetate copolymers. US2002/0025427 and US2003/0003284 describe several commercially available polymeric binders such as Mowilith® or Mowital® also applicable to the present embodiment. The following disclosures WO03064025, WO2003/097227, WO2003/0215640, US2004/0077738, US2005/025952 all of which are incorporated by reference pertain to insulation panels that can be formed from a composite comprising hydrophobic silica aerogel particles and an aqueous binder.

It is anticipated that many minor modifications and variations could be made in the invention described herein without changing the essential elements thereof and it is understood that all such modifications and variations are embraced within the purview of this invention.

What is claimed is:

1. A method of incorporating an additive into an aerogel material comprising the steps of:

providing a solution comprising gel precursors;

incorporating an additive into said solution prior to gellation thereof, said additive comprising a compound having a general formula $(Fe,Mn)(Fe,Mn)_2O_4$:CuO;

mixing a nitrogen containing fibrous material with said solution;

allowing said solution to form a gel; and drying said gel thereby resulting in an aerogel material.

2. The method of claim 1 wherein said compound comprises C.I. pigment black 26.

3. A method of incorporating an additive into an aerogel material comprising the steps of:

providing a solution comprising gel precursors;

incorporating an additive into said solution prior to gellation thereof, said additive comprising F-6331-2 COAL BLACK;

mixing a nitrogen containing fibrous material with said solution;

allowing said solution to form a gel; and drying said gel thereby resulting in an aerogel material.

4. The method of claim 1 wherein the additive comprises a mixture of metal oxides.

5. The method of claim 1 wherein said compound has a spinel structure.

6. The method of claim 2 wherein said additive comprises iron, copper, manganese, molybdenum or a combination thereof.

7. The method of claim 1 wherein the additive is present at between about 0.1% and about 10% by weight of the aerogel composite.

8. The method of claim 1 wherein the gel is dried with a supercritical fluid.

9. The method of claim 1 wherein the aerogel comprises an inorganic material.

10. The method of claim 9 wherein the aerogel comprises silica, titania, zirconia, alumina, hafnia, yttria, ceria, carbides nitrides or a combination thereof.

11. The method of claim 1 further comprising the step of introducing said solution into a fibrous material.

12. The method of claim 11 wherein the fibrous material is a felt, mat, batting, chopped fibers or a combination thereof.

13. An aerogel material comprising:

at least one nitrogen containing fibrous material;

at least one additive dispersed within said aerogel material, wherein said additive comprises a compound having a general formula $(Fe,Mn)(Fe,Mn)_2O_4$:CuO.

14. The aerogel material of claim 13 wherein said compound comprises C.I. pigment black 26.

15. The aerogel material of claim 13 wherein said additive comprises an oxide.

16. The aerogel material of claim 13 wherein the additive comprises a mixture of metal oxides.

17. An aerogel material comprising:

at least one nitrogen containing fibrous material;

at least one additive dispersed within said aerogel material, wherein said additive comprises F-6331-2 COAL BLACK.

18. The aerogel material of claim 13 wherein said compound has a spinel structure.

19. The aerogel material of claim 13 wherein said additive comprises iron, copper, manganese, molybdenum or a combination thereof.

20. The aerogel material of claim 13 wherein the additive is present at between about 0.1% and 10% by weight of the aerogel material.

21. The aerogel material of claim 13 wherein the aerogel comprises an inorganic material.

22. The aerogel material of claim 13 wherein the aerogel structure comprises silica, titania, zirconia, alumina, hafnia, yttria, ceria, carbides nitrides or a combination thereof.

23. The aerogel material of claim 13 wherein the fibrous material is in the form of a felt, mat, batting, chopped fibers or a combination thereof.

24. A composition comprising aerogel particulates, a nitrogen containing fibrous material and an additive comprising a compound, said compound comprising at least two different metals and cupric oxide.

25. The composition of claim 24 wherein said compound is an oxide.

26. The composition of claim 24 wherein the additive comprises a mixture of metal oxides.

27. The composition of claim 24 wherein said compound comprises C.I. pigment black 26.

28. The composition of claim 24 wherein said compound has a spinel structure.

29. The composition of claim 24 wherein said compound comprises iron, copper, manganese, molybdenum or a combination thereof.

30. The composition of claim 24 wherein said compound has a general chemical formula of $(Fe,Mn)(Fe,Mn)_2O_4:CuO$.

31. The composition of claim 24 wherein the additive is present at between about 0.1% and 10% by weight of the aerogel material.

32. The composition of claim 24 wherein the aerogel comprises an inorganic material.

33. The composition of claim 24 wherein the aerogel structure comprises silica, titania, zirconia, alumina, hafnia, yttria, ceria, carbides nitrides or a combination thereof.

34. The composition of claim 24 wherein the fibrous material is in the form of a felt, mat, batting, chopped fibers or a combination thereof.

* * * * *